US010997004B2

United States Patent
Arno et al.

(12) United States Patent
(10) Patent No.: US 10,997,004 B2
(45) Date of Patent: *May 4, 2021

(54) DETECTING CO-RESIDENT SERVICES IN A CONTAINER CLOUD

(71) Applicant: International Business Machines Corporation, Armonk, NY (US)

(72) Inventors: Alisa Arno, Fujimino (JP); Yuji Watanabe, Chuouku (JP); Ai Yoshino, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,257

(22) Filed: Jan. 3, 2020

(65) Prior Publication Data

US 2020/0142761 A1    May 7, 2020

Related U.S. Application Data

(63) Continuation of application No. 15/828,585, filed on Dec. 1, 2017, now Pat. No. 10,572,320.

(51) Int. Cl.
*G06F 9/54* (2006.01)
*H04L 29/08* (2006.01)
*G06F 9/50* (2006.01)

(52) U.S. Cl.
CPC .......... *G06F 9/546* (2013.01); *G06F 9/5016* (2013.01); *G06F 9/5027* (2013.01); *G06F 9/5077* (2013.01); *H04L 67/1097* (2013.01); *H04L 67/16* (2013.01)

(58) Field of Classification Search
None
See application file for complete search history.

(56) References Cited

U.S. PATENT DOCUMENTS

| 9,009,385 B1 | 4/2015 | Juels |
| 9,411,611 B2 | 8/2016 | Herger |
| 9,602,549 B2 | 3/2017 | Boyer |

(Continued)

FOREIGN PATENT DOCUMENTS

EP    3396543 A1    10/2018

OTHER PUBLICATIONS

"OS-level virtualisation", from Wikipedia, the free encyclopedia, 6 pages, this page last edited on Apr. 9, 2019, <https://en.wikipedia.org/wiki/OS-level_virtualisation>.

(Continued)

*Primary Examiner* — Shih-Wei Kraft
(74) *Attorney, Agent, or Firm* — William H. Hartwell

(57) ABSTRACT

In an approach to detection of co-location of container services, a method may include monitoring a load on one or more resources accessible by cloud containers located on a first host. The method may further include identifying a bit string from the monitored load of the one or more resources. A high load on the one or more resources for a time period indicates a first bit value, and a low load on the one or more resources for the time period indicates a second alternate bit value. The method may further include receiving a shared key corresponding to a second program in a second cloud container. The method may further include determining the second cloud container is located on the first host based on the shared key matching a key corresponding to the identified bit string.

20 Claims, 7 Drawing Sheets

(56) References Cited

U.S. PATENT DOCUMENTS

| | | |
|---|---|---|
| 9,727,522 B1 | 8/2017 | Barber |
| 2008/0033974 A1 | 2/2008 | Cameron |
| 2012/0131641 A1 | 5/2012 | Kavantzas |
| 2013/0304899 A1 | 11/2013 | Winkler |
| 2014/0245326 A1 | 8/2014 | Kruglick |
| 2015/0124828 A1 | 5/2015 | C J |
| 2015/0128131 A1 | 5/2015 | Cao |
| 2016/0308845 A1 | 10/2016 | Quinlan |
| 2017/0005806 A1 | 1/2017 | Brand |
| 2018/0307537 A1 | 10/2018 | Chen |
| 2019/0171502 A1 | 6/2019 | Arno |

OTHER PUBLICATIONS

Mell et al., "The NIST Definition of Cloud Computing", Recommendations of the National Institute of Standards and Technology, Special Publication 800-145, Sep. 2011, 7 pages.

Wong, William G., "What's the Difference Between Containers and Virtual Machines", Jul. 15, 2016, Electronic Design, 6 pages, <https://www.electronicdesign.com/dev-tools/what-s-difference-between-containers-and-virtual-machines>.

Zhang et al., "Cross-Tenant Side-Channel Attacks in PaaS Clouds", CCS'14, Nov. 3-7, 2014, pp. 990-1003, ACM: 978-1-4503-2957-611411.

IBM, "List of IBM Patents or Patent Applications Treated as Related", Appendix P, 2 pages, dated Jan. 7, 2020.

| $K =$ | 1011 |
|---|---|
| $s =$ | 1011100 |
| $c =$ | CPU |
| $t =$ | 0.2s |
| $t * \Delta t =$ | 1.4s |

DETECTING CO-RESIDENT SERVICES IN A CONTAINER CLOUD

BACKGROUND OF THE INVENTION

The present invention relates generally to the field of containers, and more particularly to detecting co-location of services in a container host.

Containers are application delivery technology. They give developers flexibility to build and move applications without the need to rewrite or redeploy code. Containers provide tools to automate the deployment of applications. A container image is a stand-alone, executable package of a piece of software that includes everything needed to run it including code, libraries, settings, and other necessary specifications.

SUMMARY

Embodiments of the present invention disclose a method, a computer program product, and a system for detecting co-resident services in a container host. The method may include monitoring, by a first program in a first cloud container on a first host, a load on one or more resources on the first host, where the one or more resources are accessible by cloud containers located on the first host. The one or more resources include a processor, where a high load on the one or more resources includes the processor performing processor-intensive operations, and wherein a low load on the one or more resources includes the processor performing a low amount of operation calls. The method may further include identifying, by the first program, a bit string from the monitored load of the one or more resources. The high load on the one or more resources for a time period indicates a first bit value, and the low load on the one or more resources for the time period indicates a second alternate bit value. The method may further include receiving, by the first program, a shared key corresponding to a second program in a second cloud container. The method may further include determining, by the first program, the second cloud container is located on the first host based, at least in part, on the shared key matching a key corresponding to the identified bit string.

DETAILED DESCRIPTION

Figure 1:
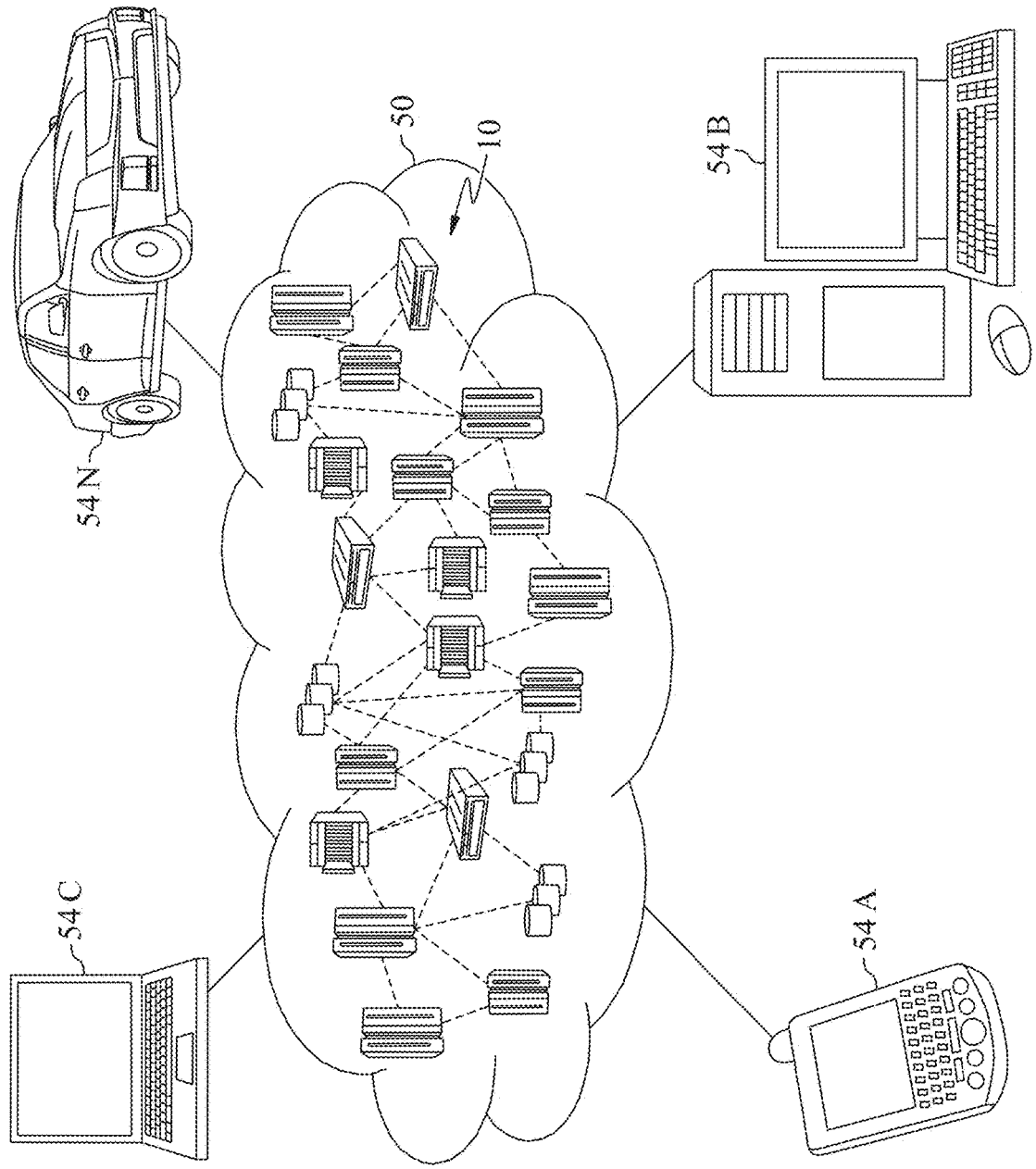
FIG. 1 depicts a cloud computing environment according to an embodiment of the present invention.

It can be difficult for two collaborative applications running on different containers to find co-location (e.g., determine whether they are running on the same host computer) without having direct access to the host. In this context, a container is an isolated environment from the rest of a host system. Containers typically have limited access to monitor the host system and virtually no access to monitor other containers running on the same host system. Containers run from a software image that provides all files necessary to execute a set of processes, where the set of processes provide one or more services, e.g., web-based applications, databases, among others.

Embodiments of the present invention detect co-location of resident services in a container cloud by encoding, by a first instance of a co-location program at a first container, a shared key K using an error correction code (ECC) and successively transferring each bit b in bit string s via one or more side channels c. A second instance of the co-location program at a second container receives a bit string s' over the one or more side channels c and determines key K' by decoding bit string s' using the ECC. If the shared key K matches the determined key K', the second instance of co-location program determines that it is hosted on the same host computer as the first co-location program.

Implementation of embodiments of the present invention may take a variety of forms, and exemplary implementation details are discussed subsequently with reference to the Figures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
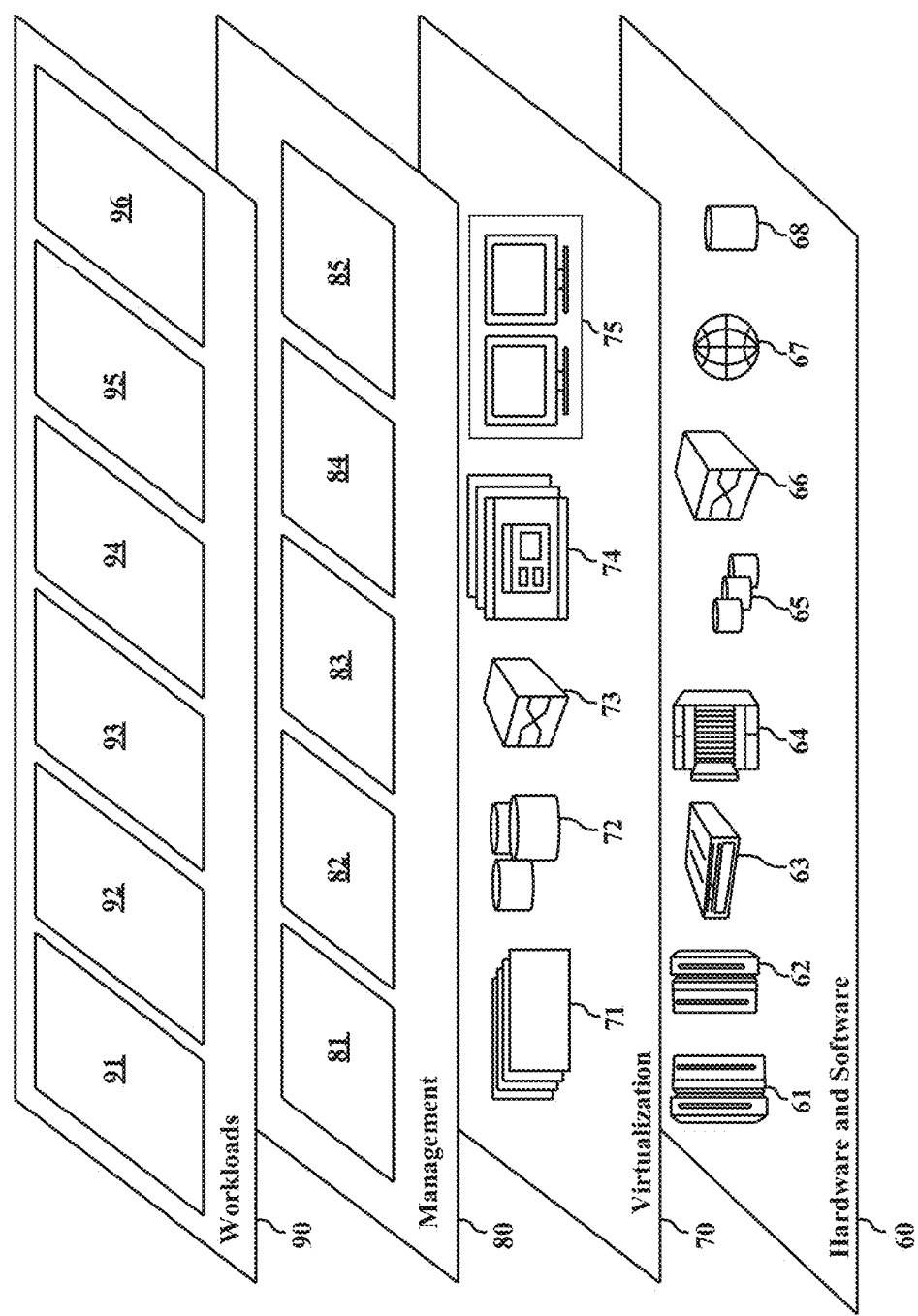
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and co-location service 96.

Figure 3:
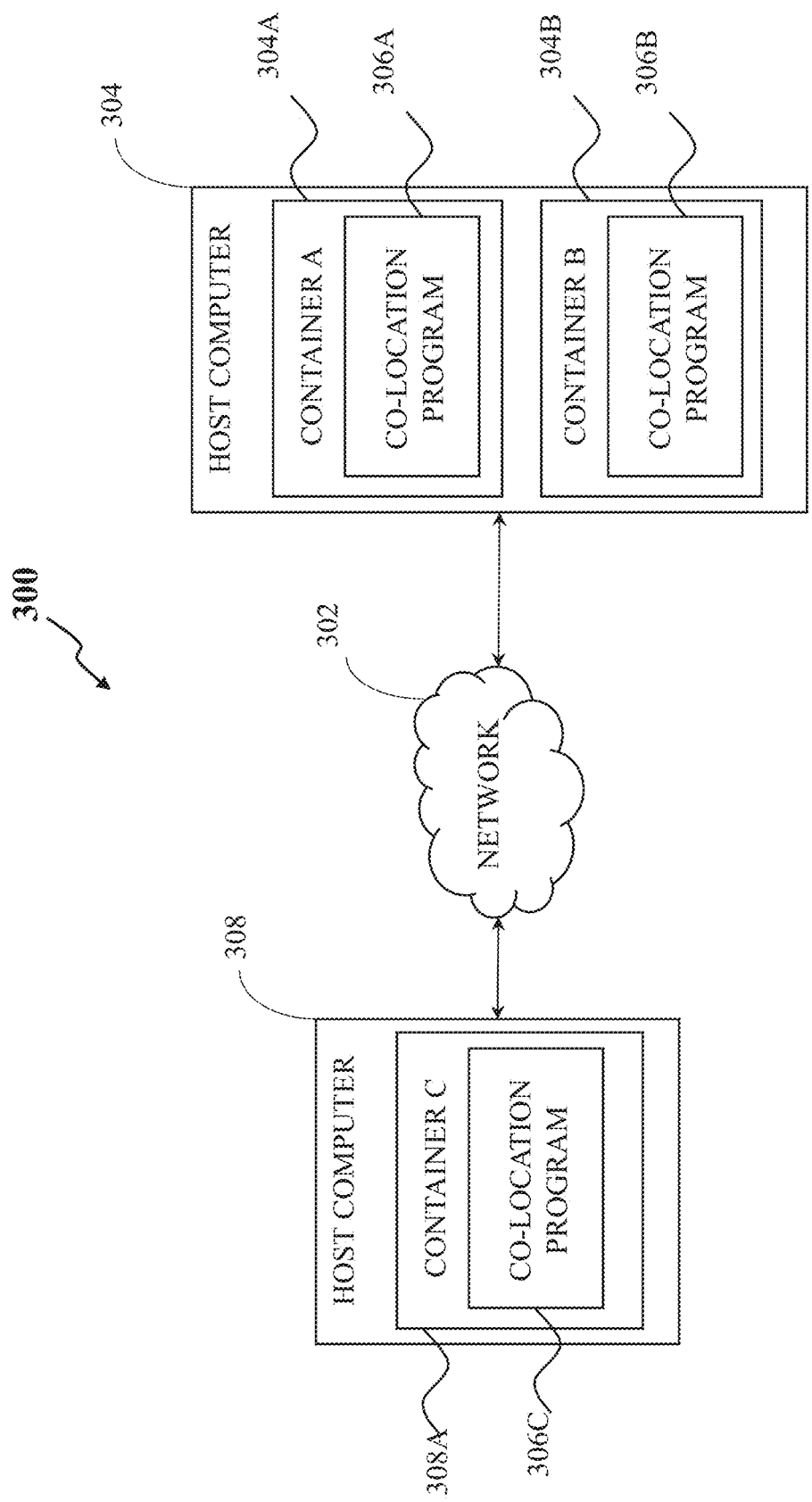
FIG. 3 is a functional block diagram illustrating a distributed data processing environment, in accordance with an embodiment of the present invention.

FIG. 3 is a functional block diagram illustrating a distributed data processing environment, generally designated 300, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 300 includes host computer 304 and host computer 308, all interconnected over network 302.

In general, network 302 can be any combination of connections and protocols that will support communications between host computer 304 and host computer 308, and other computing devices (not shown) within distributed data processing environment 300. Network 302 can be, for example, a telecommunications network, a local area network (LAN), a wide area network (WAN), such as the Internet, or a combination of the three, and can include wired, wireless, or fiber optic connections. Network 302 can include one or more wired and/or wireless networks that can receive and transmit data, voice, and/or video signals, including multimedia signals that include voice, data, and video information.

Host computer 304 can be a standalone computing device, a management server, a content service, a mobile computing device, or any other electronic device or computing system capable of receiving, sending, and processing data. In other embodiments, host computer 304 can represent a server computing system utilizing multiple computers as a server system, such as in a cloud computing environment. In another embodiment, host computer 304 can be a laptop computer, a tablet computer, a netbook computer, a personal computer (PC), a desktop computer, a personal digital assistant (PDA), a smart phone, or any other programmable electronic device capable of communicating with host computer 308, and other computing devices (not shown) within distributed data processing environment 100 via network 302. In another embodiment, host computer 304 represents a computing system utilizing clustered computers and components (e.g., database server computers, application server computers, etc.) that act as a single pool of seamless resources when accessed within distributed data processing environment 100. Host computer 308 may be an equivalent electronic device or computing system capable of receiving, sending, and processing data as described with respect to host computer 304. Host computer 304 may include internal and external hardware components, as depicted and described in further detail with respect to FIG. 7.

Host computer 304 includes container 304A and container 304B. Host computer 308 includes container 308A. Container 304A includes an instance of co-location program 306A, container 304B includes an instance of co-location program 306B, and container 308A includes an instance of co-location program 306C.

In some embodiments of the present invention, co-location program 306A sends a bit string s to one or more containers running an instance of co-location program, such as co-location program 306B and co-location program 306C, by encoding a shared key K using an error correction code (ECC) and successively transferring each bit b in bit string s via one or more side channels c. Co-location program 306A may iterate over each bit b of bit string s and send each bit b over the side channels c as follows: (i) if the bit b=1, co-location program 306A sends the bit b by generating a high load on the one or more side channels c for a time period t; and (ii) if the bit b=0, co-location program 306A sends the bit b by staying idle on the one or more side channels c for a time period t. In some embodiments, co-location program 306A may continue sending the bit string s repeatedly until a trial period t*Δt has elapsed.

In some embodiments of the present invention, co-location program 306A may generate the shared key K. In these and other embodiments, co-location program 306A may send the shared key K to one or more containers running an instance of co-location program, such as co-location program 306B and co-location program 306C. In some embodiments, one or more containers running an instance of co-location program, including co-location program 306A, may receive the shared key K as part of their respective container specifications. In other embodiments, one or more containers running an instance of co-location program, including co-location program 306A, may receive the shared key K from other computing devices (not shown).

Host computer 304 includes an instance of co-location program 306B. Host computer 308 includes an instance of co-location program 306C. In some embodiments of the present invention, one or more containers running an instance of co-location program, such as co-location program 306B and co-location program 306C, receive a bit string s' over the one or more side channels c within the trial period t*Δt and determine a key K' by decoding the bit string s' using the ECC. In some embodiments, one or more containers running an instance of co-location program may compare the shared key K with the respective determined key K'. If the shared key K matches the determined key K', the respective instance of co-location program determines that it is co-located in the same host computer as co-location program 306A. If the shared key K does not match the determined key K', the respective instance of co-location program determines that it is not co-located in the same host computer as co-location program 306A.

Figure 4:
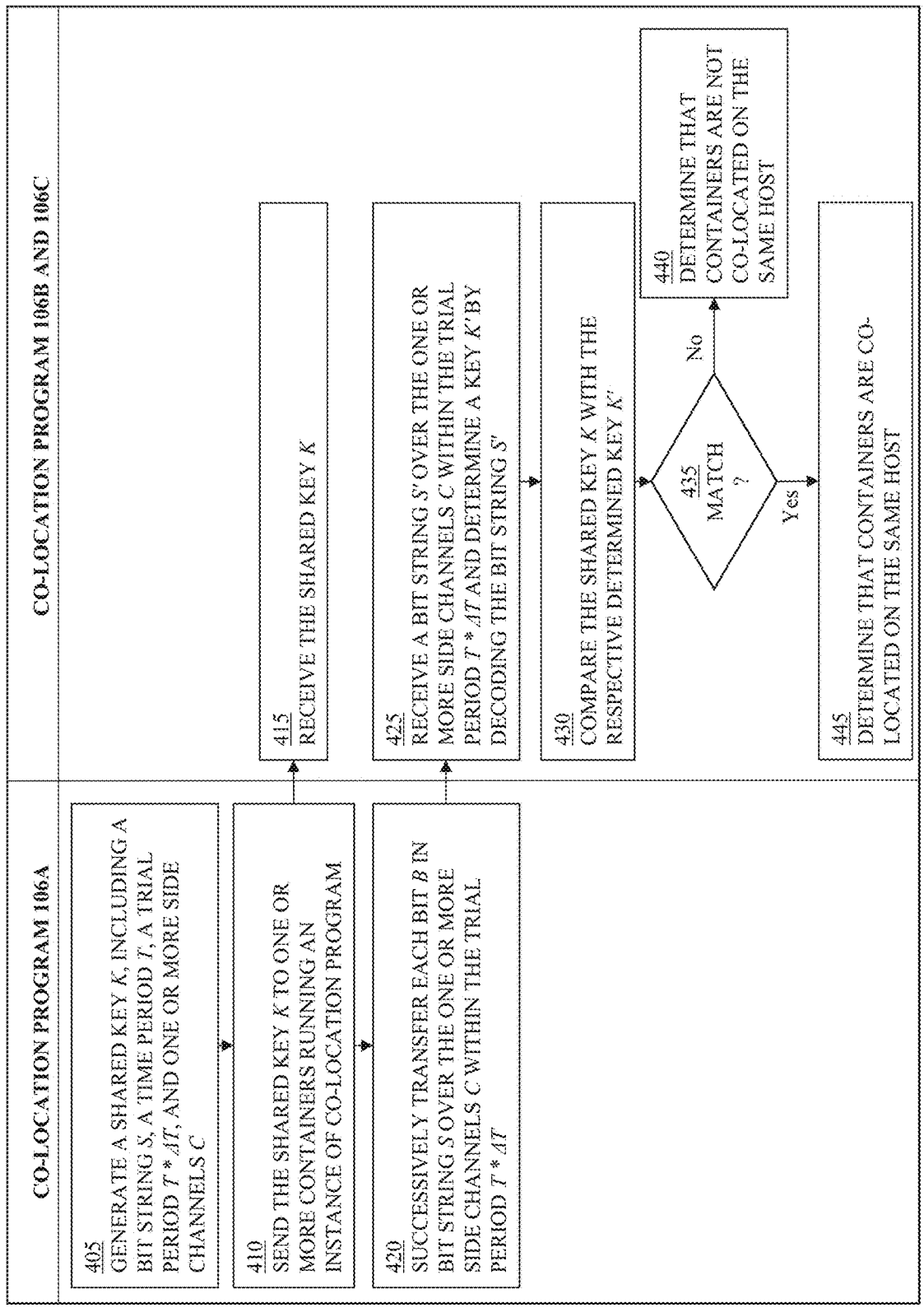
FIG. 4 is a flowchart depicting operational steps of a co-location program for determining co-location of containers, in accordance with an embodiment of the present invention.

Co-location program 306 is depicted and described in further detail with respect to FIG. 4. Referring to flowchart 400, co-location program 306 allows communication between a first application and a second application running on container hosts in a cloud server where the first application and the second application do not have access to host commands.

Processing begins at operation 405, where co-location program 306A generates a shared key K, including a bit string s, where s is obtained by encoding the shared key K using an error-correcting code (ECC). In some embodiments of the present invention, the shared key K is a bit string of length k<n, where n is the maximum length of the ECC. In some embodiments, the shared key K includes the time period t and a trial period t*Δt. In some embodiments, the time period t represents the duration to transmit exactly one bit of the ECC. In some embodiments, the trial period t*Δt represents the duration to transmit the n bits of the ECC.

In some embodiments, the shared key K further includes an identification of one or more side channels c for communication between one or more containers running an instance of co-location program, such as co-location program 306B and/or co-location program 306C. In some embodiments of the present invention, the side channel includes any resource such that, when the first application puts an unusually high load over a time period t, a second application co-located on a same host can observe its unusual high load. By way of example, co-location program 306A may include the following as a side channel c: (i) the processor, by performing intensive operations on a processor for a time period t, (ii) the memory, by utilizing the totality of the allocated memory for a time period t; and/or (iii) the disk storage, by storing a large object and maintaining the object stored.

Figure 5:
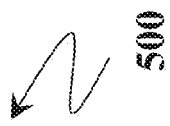
FIG. 5 is an illustration depicting an exemplary shared key, in accordance with an embodiment of the present invention.

In an exemplary embodiment, there are three containers (i.e., container 304A, container 304B, and container 308A) each running an instance of co-location program (i.e., co-location program 306A, co-location program 306B, and co-location program 306C, respectively). As shown in FIG. 5 (see, table 500), co-location program 306A generates the shared key K=1011. Co-location program 306A also specifies time period t=0.2 s and trial period t*Δt=1.4 s. Co-location program 306A further specifies side channel c=CPU. In this example, co-location program 306A determines the ECC by encoding K using a (7,4)-hamming code with corresponding bit string s=1011100.

Processing continues at operation 410, where co-location program 306A sends the shared key K to one or more containers running an instance of co-location program, such as co-location program 306B and/or co-location program 306C. In some embodiments of the present invention, co-location program 306A sends the shared key K to one or more containers running an instance of co-location program via network 302. In other embodiments, one or more containers running an instance of co-location program, including co-location program 306A, may include the shared key K as part of the container specification.

In the exemplary embodiment, co-location program 306A sends the shared key K with co-location program 306B and co-location program 306C over network 302 to initiate detection of containers located in the same host as container 304A.

Processing continues at operation 415, where one or more containers running an instance of co-location program, such as co-location program 306B and/or co-location program 306C, receive a shared key K from co-location program 306A. In some embodiments of the present invention, one or more containers running an instance of co-location program receive a shared key K from co-location program 306A and/or other computing devices (not shown) via network 302. In other embodiments, one or more containers running an instance of co-location program, including co-location program 306A, may include the shared key K as part of the container specification.

In the exemplary embodiment, co-location program 306B and co-location program 306C receive the shared key K from co-location program 306A over network 302 to initiate detection of containers located in the same host as container 304A.

Processing continues at operation 420, where co-location program 306A successively transfers each bit b in bit string s over the one or more side channels c within the trial period t*Δt. In some embodiments of the present invention, co-location program 306A iterates over each bit b of bit string s and sends each bit b by over the side channels c. If the bit b=1, co-location program 306A sends the bit b by generating a high load on the side channel c for a time period t. If the bit b=0, co-location program 306A sends the bit b by staying idle on the side channel c for a time period t.

In some embodiments, co-location program 306A may generate a high load on the memory (e.g., a volatile memory) as a side channel by using a high amount (e.g., more than 80%) of the allocated memory of the container. In some embodiments, co-location program 306A may generate a high load on the disk storage (e.g., a persistent memory) as a side channel c by storing a large object (e.g., more than 10% of the disk storage available to the container) and maintaining the object stored for a time period t. In some embodiments, co-location program 306A may generate a high load on the CPU as a side channel c by consistently producing a high CPU usage (e.g., more than 90% usage) for a time period t. In some embodiments, co-location program 306A may generate a low load on the memory (e.g., a volatile memory) as a side channel by using a low amount (e.g., less than 5%) of the allocated memory of the container. In some embodiments, co-location program 306A may generate a low load on the disk storage (e.g., a persistent memory) as a side channel c by using a low amount of disk storage (e.g., deleting a large object) for a time period t. In some embodiments, co-location program 306A may generate a low load on the CPU as a side channel c by waiting (e.g., generating no operation calls) for a time period t. In some embodiments, co-location program 306A sends bit string s repeatedly while trial period t*Δt has not elapsed.

It should be noted that the above examples of a "high load," a "high amount," a "low load," and a "low amount," are merely examples, and that many other known (or yet to be known) methods and values for determining and communicating relatively high and relatively low loads and amounts may be used, so long as the differences between what comprises a "high" load or amount and what comprises a "low" load or amount is understood by both the sender and the recipient of a given bit string being delivered over a side channel. Furthermore, while the above embodiments generally indicate that "high" loads represent a bit value of "1" and that "low" loads represent a bit value of "0," these examples also are not meant to be limiting, and other embodiments may provide the opposite arrangement ("high" loads representing bit values of "0" and "low" loads representing bit values of "1") or may provide for bit values beyond those in a binary, two-state bit configuration (for example, having a "high" load represent a bit value of "0," a "medium" load represent a bit value of "1," and a "low" load represent a bit value of "2").

Figure 6:
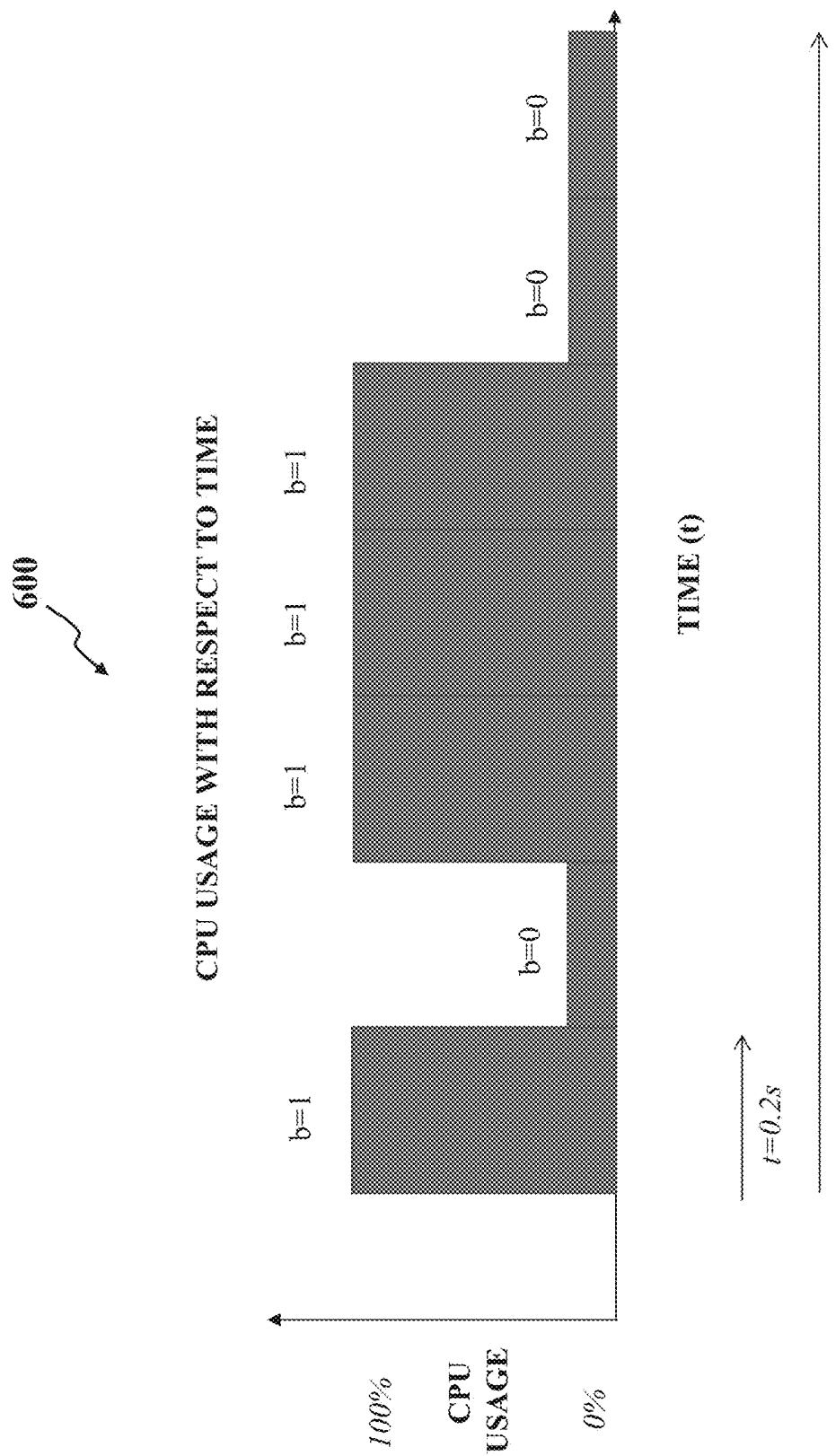
FIG. 6 is a graphic depiction of the transmission of a bit string over a side channel, in accordance with an embodiment of the present invention.

In the exemplary embodiment, co-location program 306A successively sends each bit in bit string s=1011100 over the side channel c corresponding to the CPU. As shown in FIG. 6 (see, graph 600), this objective is achieved by iterating over each bit b in bit string s. If bit b=1, co-location program 306A generates a consistently high CPU usage for t=0.2 s. Conversely, if bit b=0, co-location program 306A pauses execution (e.g., by using sleep or a similar system call) for t=0.2 s. In this example, trial period t*Δt=1.4 s elapses after sending bit string s once.

Processing proceeds at operation 425, where one or more containers running an instance of co-location program, such as co-location program 306B and/or co-location program 306C, receive a bit string s' over the one or more side channels c within the trial period t*Δt and determine a key K' by decoding the bit string s' using the ECC. In some embodiments of the present invention, one or more containers running an instance of co-location program receive the bit string s' by observing high loads on the one or more side channels c consistent with the time period t and the trial period t*Δt.

In the exemplary embodiment, co-location program 306B receives bit string s'=1011100 the side channel corresponding to the CPU by observing the CPU usage behavior of co-location program 306A. Co-location program 306B decodes s'=1011100 to K'=1011 by using a (7,4)-hamming code. On the other hand, co-location program 306C receives bit string s'=0000000 the side channel corresponding to the CPU because it cannot observe any pattern of CPU usage behavior. Co-location program 306C decodes s'=0000000 to K'=0000 by using a (7,4)-hamming code.

Processing proceeds at operation 430, where one or more containers running an instance of co-location program, such as co-location program 306B and/or co-location program 306C, compare the shared key K with their respective determined key K'. In some embodiments of the present invention, one or more containers running an instance of co-location program compare the shared key K with their respective determined key K' by direct comparison of the respective values of K and K'. In other embodiments, the comparison may be achieved by other methods such as determining that the result of a bitwise exclusive-or is zero.

In the exemplary embodiment, co-location program 306B compares K=1011 with determined K'=1011. Co-location program 306C compares K=1011 with determined K'=0000.

If the shared key K does not match the determined key K' (operation 435, "no" branch), processing continues at operation 440, where one or more containers running an instance of co-location program, such as co-location program 306B and/or co-location program 306C, determine that co-location program 306A is not co-located on the same host.

In the exemplary embodiment, co-location program 306C determines that shared key K=0000 is not equal to determined key K'=1011. Therefore, co-location program 306C determines that container 304C is not hosted in the same host computer as container 304A.

If the shared key K matches the determined key K' (operation 435, "yes" branch), processing continues at operation 445, where one or more containers running an instance of co-location program, such as co-location program 306B and/or co-location program 306C, determine that co-location program 306A is co-located on the same host.

In the exemplary embodiment, co-location program 306B determines that shared key K=1011 is equal to determined key K'=1011. Therefore, co-location program 306B determines that container 304B is hosted in the same host computer as container 304A.

Figure 7:
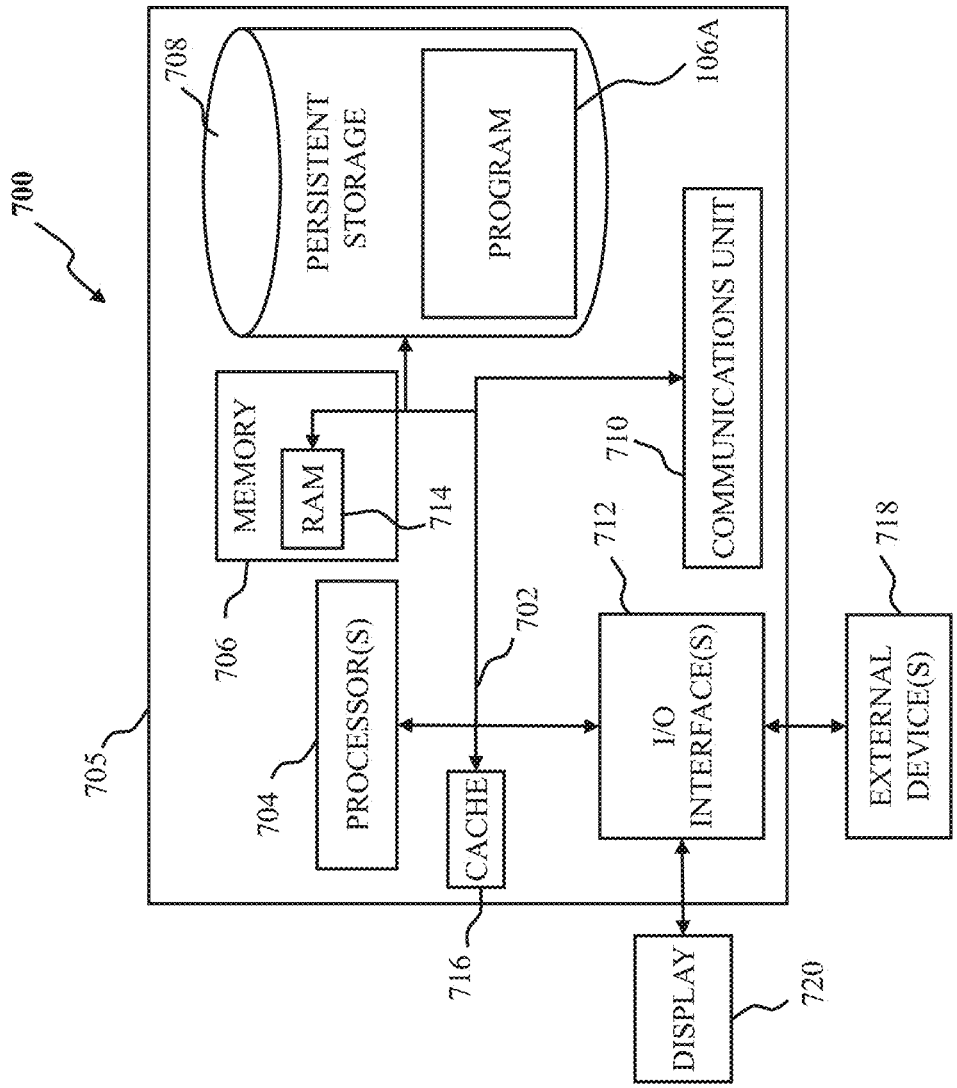
FIG. 7 depicts a block diagram of components of the server computer executing the user identification program within the distributed data processing environment of FIG. 3, in accordance with an embodiment of the present invention.

FIG. 7 depicts a block diagram 700 of components of host computer 304 within distributed data processing environment 300 of FIG. 3, in accordance with an embodiment of the present invention. It should be appreciated that FIG. 7 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing device 705 and host computer 304 include communications fabric 702, which provides communications between computer processor(s) 704, memory 706, persistent storage 708, communications unit 710, and input/output (I/O) interface(s) 712.

Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 714 and cache memory 716. In general, memory 706 can include any suitable volatile or non-volatile computer-readable storage media.

Co-location program 306 is stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 710, in these examples, provides for communications with other data processing systems or devices, including resources of distributed data processing environment 100. In these examples, communications unit 710 includes one or more network interface cards. Communications unit 710 may provide communications through the use of either or both physical and wireless communications links. Co-location program 306 may be downloaded to persistent storage 708 through communications unit 710.

I/O interface(s) 712 allows for input and output of data with other devices that may be accessible to computing device 705 and host computer 304, such as host computer 308, and other computing devices (not shown). For example, I/O interface 712 may provide a connection to external devices 718 such as a keyboard, keypad, a touch screen, and/or some other suitable input device. External devices 718 can also include portable computer-readable storage media such as, for example, thumb drives, portable optical or magnetic disks, and memory cards. Software and data used to practice embodiments of the present invention, e.g., co-location program 306 can be stored on such portable computer-readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, comprising:
   monitoring, by a first program in a first cloud container on a first host, a load on one or more resources on the first host, wherein the one or more resources are accessible by cloud containers located on the first host;

identifying, by the first program, a bit string from the monitored load of the one or more resources, wherein a high load on the one or more resources for a time period indicates a first bit value, and wherein a low load on the one or more resources for the time period indicates a second alternate bit value;

determining, by the first program, a key corresponding to the identified bit string by decoding the bit string using a predetermined error correcting code;

receiving, by the first program, as part of a container specification file, a shared key corresponding to a second program in a second cloud container; and determining, by the first program, the second cloud container is located on the first host based, at least in part, on the shared key matching the determined key corresponding to the identified bit string.

2. The method of claim 1, wherein the one or more resources include a volatile memory, wherein the high load on the one or more resources includes utilizing a high amount of allocated memory, and wherein the low load on the one or more resources includes utilizing a low amount of allocated memory.

3. The method of claim 1, wherein the one or more resources include a non-volatile memory, wherein the high load on the one or more resources includes utilizing a high amount of storage storing a large object in the non-volatile memory, and wherein the low load on the one or more resources includes utilizing a low amount of allocated memory.

4. The method of claim 1, wherein the first bit value is 1 and the second alternate bit value is 0.

5. The method of claim 1, further comprising determining, by the first program, that the determined key corresponding to the identified bit string matches the shared key.

6. The method of claim 1, wherein the one or more resources include a processor.

7. The method of claim 6, wherein the high load on the one or more resources includes the processor performing processor-intensive operations, and wherein the low load on the one or more resources includes the processor performing a low amount of operation calls.

8. A computer program product, comprising:
one or more computer readable storage devices and program instructions stored on the one or more computer readable storage devices, the stored program instructions comprising:
program instructions to monitor a load on one or more resources on a first host, wherein the one or more resources are accessible by cloud containers located on the first host;
program instructions to identify a bit string from the monitored load of the one or more resources, wherein a high load on the one or more resources for a time period indicates a first bit value, and wherein a low load on the one or more resources for the time period indicates a second alternate bit value;
program instructions to determine a key corresponding to the identified bit string by decoding the bit string using a predetermined error correcting code;
program instructions to receive, as part of a container specification file, a shared key corresponding to a second program in a second cloud container; and
program instructions to determine the second cloud container is located on the first host based, at least in part, on the shared key matching the determined key corresponding to the identified bit string.

9. The computer program product of claim 8, wherein the one or more resources include a volatile memory, wherein the high load on the one or more resources includes utilizing a high amount of allocated memory, and wherein the low load on the one or more resources includes utilizing a low amount of allocated memory.

10. The computer program product of claim 8, wherein the one or more resources include a non-volatile memory, wherein the high load on the one or more resources includes utilizing a high amount of storage storing a large object in the non-volatile memory, and wherein the low load on the one or more resources includes utilizing a low amount of allocated memory.

11. The computer program product of claim 8, wherein the first bit value is 1 and the second alternate bit value is 0.

12. The computer program product of claim 8, the stored program instructions further comprising program instructions to determine that the determined key corresponding to the identified bit string matches the shared key.

13. The computer program product of claim 8, wherein the one or more resources include a processor.

14. The computer program product of claim 13, wherein the high load on the one or more resources includes the processor performing processor-intensive operations, and wherein the low load on the one or more resources includes the processor performing a low amount of operation calls.

15. A computer system, comprising:
one or more computer processors;
one or more computer readable storage devices;
program instructions stored on the one or more computer readable storage devices for execution by at least one of the one or more computer processors, the stored program instructions comprising:
program instructions to monitor a load on one or more resources on a first host, wherein the one or more resources are accessible by cloud containers located on the first host;
program instructions to identify a bit string from the monitored load of the one or more resources, wherein a high load on the one or more resources for a time period indicates a first bit value, and wherein a low load on the one or more resources for the time period indicates a second alternate bit value;
program instructions to determine a key corresponding to the identified bit string by decoding the bit string using a predetermined error correcting code;
program instructions to receive, as part of a container specification file, a shared key corresponding to a second program in a second cloud container; and
program instructions to determine the second cloud container is located on the first host based, at least in part, on the shared key matching the determined key corresponding to the identified bit string.

16. The computer system of claim 15, wherein the one or more resources include a volatile memory, wherein the high load on the one or more resources includes utilizing a high amount of allocated memory, and wherein the low load on the one or more resources includes utilizing a low amount of allocated memory.

17. The computer system of claim 15, wherein the one or more resources include a non-volatile memory, wherein the high load on the one or more resources includes utilizing a high amount of storage storing a large object in the non-volatile memory, and wherein the low load on the one or more resources includes utilizing a low amount of allocated memory.

18. The computer system of claim 15, wherein the first bit value is 1 and the second alternate bit value is 0.

19. The computer system of claim 15, wherein the one or more resources include a processor.

20. The computer system of claim 19, wherein the high load on the one or more resources includes the processor performing processor-intensive operations, and wherein the low load on the one or more resources includes the processor performing a low amount of operation calls.

* * * * *